May 2, 1967

N. SHORR 3,317,303

TRACTION ROLLS AND MATERIAL HANDLING
APPARATUS EMPLOYING SUCH ROLLS

Filed Feb. 15, 1965

INVENTOR
NORMAN SHORR

BY Chisholm and Spencer

ATTORNEYS

May 2, 1967  N. SHORR  3,317,303
TRACTION ROLLS AND MATERIAL HANDLING
APPARATUS EMPLOYING SUCH ROLLS
Filed Feb. 15, 1965  2 Sheets-Sheet 2

INVENTOR
NORMAN SHORR

BY

ATTORNEYS

United States Patent Office 3,317,303
Patented May 2, 1967

3,317,303
TRACTION ROLLS AND MATERIAL HANDLING APPARATUS EMPLOYING SUCH ROLLS
Norman Shorr, Pittsburgh, Pa., assignor to Pittsburgh Plate Glass Company, Pittsburgh, Pa., a corporation of Pennsylvania
Filed Feb. 15, 1965, Ser. No. 432,518
8 Claims. (Cl. 65—253)

ABSTRACT OF THE DISCLOSURE

The invention relates to traction rolls capable of use in material handling apparatus especially adapted for operation at elevated temperatures; equipment for forming flat glass from a molten bath of glass being typical thereof. The life of these rolls is prolonged by incorporating in the fibrous surfaces thereof at least about 30 percent by weight of an asbestos of the group anthophyllite, amosite, tremolite, actinolite and mixtures thereof.

---

Figure 1:
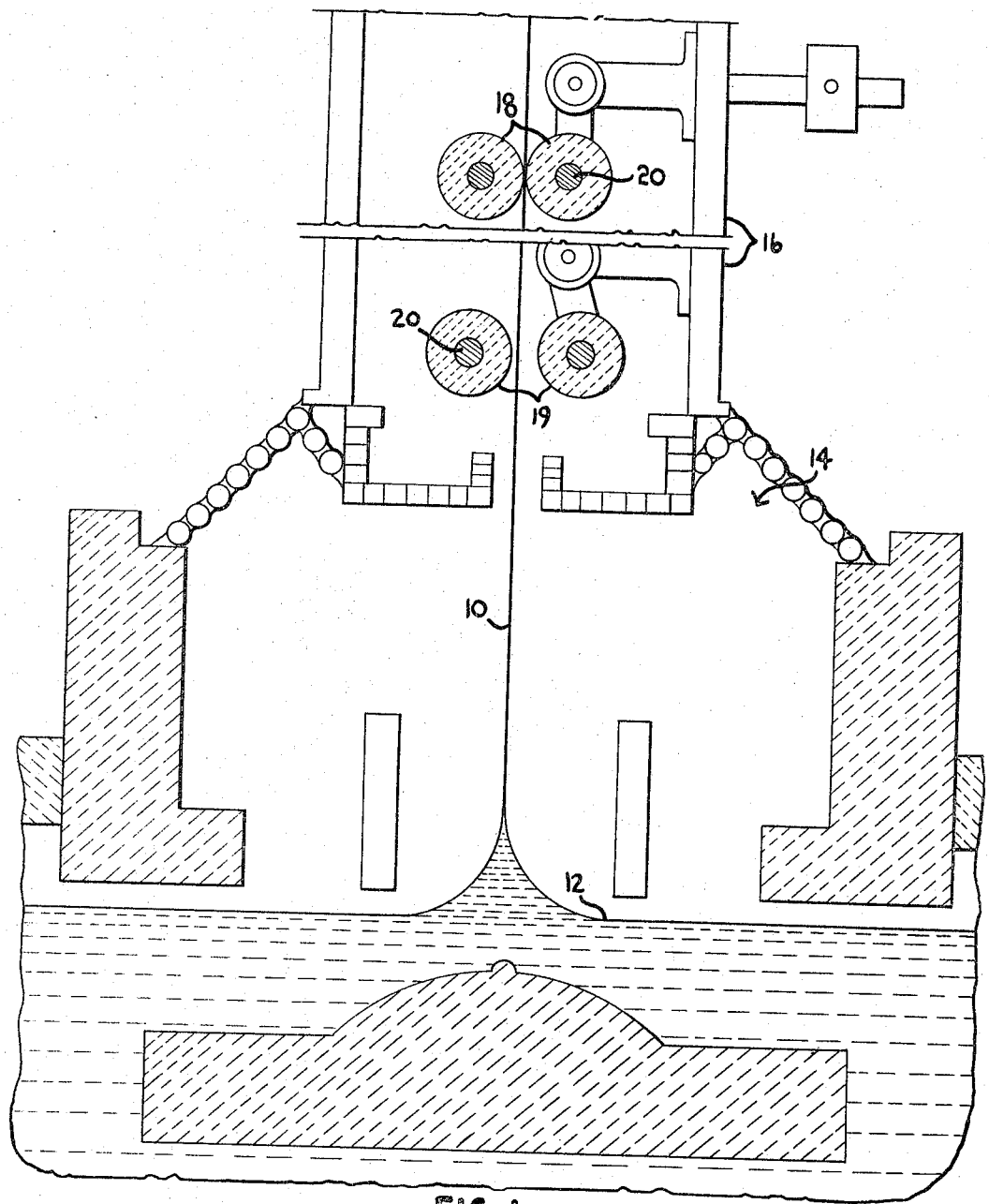

This application is a continuation-in-part of my application Ser. No. 372,272, filed June 3, 1964, which is in turn a continuation-in-part of my application, Ser. No. 330,202, filed Dec. 12, 1963, both now abandoned and entitled "Traction Rolls."

This invention relates to a novel method of supporting, handling and/or recovering glass in sheet or ribbon form and to novel apparatus for performing such process. It may be applied effectively to the so-called "Pennvernon" process of drawing sheet or window glass. A marked increase in glass quality is observed when it is applied in the proper way to the "Float" process of producing glass, a process wherein glass is deposited in molten state on a pool of molten metal, such as tin, and then is formed into a ribbon or is treated to improve the surface of a preformed ribbon by contact with molten tin. Pilkington U.S. Patent No. 3,083,551 describes a typical float glass process. The invention is especially applicable to supporting, handling and/or receiving glass while the glass is at a deformation temperature, i.e., a temperature at which it will deform or be subject to a marking deformation by contact with solid elements, generally about 900° F. and perhaps as high as 1600° F. or above. However, the invention is applicable to supporting, handling and/or conveying glass at lower temperatures as well.

The invention will first be described with respect to the Pittsburgh or Pennvernon sheet glass drawing apparatus in which a series of pairs of rolls provide the tractive force required to draw glass upwardly from a bath of molten glass. In some installations, there are approximately 30 pairs of drawing rolls in a drawing machine, the majority of which contact the surfaces of the glass. The lowermost 3 or 4 sets of rolls generally engage the glass only at the start of the process or when the ribbon or sheet is initially being formed and thereafter are held from engagement with the sheet because they would mar the hot glass surfaces by contact therewith. Typical drawing machines are illustrated by United States Patents Nos. 1,598,730 and 2,215,231.

Rolls of the same type can also be used in the Fourcault sheet glass drawing apparatus, or in any apparatus for contacting hot glass where their properties might be useful or desirable. Typical rolls are illustrated in United States Patents Nos. 1,930,999, 2,085,575, and 2,120,435.

The usual rolls used in the Pennvernon process are constructed of a plurality of discs assembled onto a steel mandrel and compressed thereon. They are clamped by collars under high pressure, as for example, 1200 to 1500 pounds per square inch. The collars being fixed under pressure maintain the discs under pressure. The assembled rolls are then lathe turned for trueness and surface finish.

The discs from which the rolls are made are cut from boards formed of a fiber-binder mix using chrysotile asbestos, the most widely used type of asbestos. A chemical composition of chrysotile asbestos is $3MgO.2Si_2.2H_2O$. While chrysotile asbestos is the most common type of asbestos, it possesses certain drawbacks when used for rolls of the type being described, and especially those rolls subjected to elevated temperature, as for example, 1000 to 1200° F. and perhaps above. Temperatures of this magnitude are experienced by at least the lowermost sets of rolls of a drawing machine and are not uncommon in the entry portion of an annealing lehr. Generally, about one-third of the sets of the drawing rolls in the Pennvernon process are subjected to these elevated temperatures.

The first fifteen rolls in a typical float glass annealing lehr having approximately 225 rolls or more throughout its length are operated at elevated temperatures of this magnitude.

At elevated temperatures of operation as high as, for example, 1200° F., and perhaps above, i.e., to about 1600° F., and after use over a period of time, for example, approximately 24 hours, a roll constructed of chrysotile asbestos acquired a glazed surface and deteriorates thereafter, so that within a short time it is not satisfactory. The mandrel on which the discs are assembled under pressure to form the roll expands and the pressure on the discs relaxes. The discs separate from one another, and in the Pennvernon process, cullet or chips of glass produced during the capping operation, i.e., when a finite sheet is cut from the continuous ribbon at the top of the drawing machine, work into the spaces between the discs and become imbedded therein. The resulting roll contacts the glass ribbon, scratches and digs into the ribbon surface and destroys or damages the fire-finished glass surfaces.

At times, it is desirable to treat the glass in the drawing machine with $SO_2$ gas, as is described in United States Patent No. 1,782,169. $SO_2$ gas is acidic in nature and when used in a drawing machine contacts the drawing rolls and reacts with the chrysotile asbestos, generating $MgSO_4$. Thus, the roll material is decomposed.

According to this invention, it has been found that the problems encountered when the roll discs are formed of chrysotile asbestos fiber and a binder and subjected to use in the aforesaid drawing process can be virtually eliminated by incorporating within the mix from which the asbestos board is made a substantial amount, for example, at least 30 percent and preferably more than 50 percent by weight of a different type of asbestos fiber based upon the total weight of asbestos fiber therein. While anthophyllite asbestos fiber is preferred, it is also possible to incorporate amosite, tremolite, and actinolite asbestos fibers or mixtures thereof, in lieu of all or a portion of anthophyllite asbestos fiber in roll discs. A chemical composition of anthophyllite asbestos is 7(MgO.FeO).8SiO₂.HO; that of amosite asbestos is (FeMg)SiO₃.H₂O; that of tremolite is $$Ca_2Mg5Si_8O_{22}(OH)_2$$

and that of actinolite is $Ca(Mg.Fe)_3(SiO_3)_4.H_2O$. Such asbestos has an ignition loss, i.e., loss in weight of less than 5 percent, preferably below 1.5 percent by weight when heated for 24 hours at 1200° F.

Generally, it is preferred that the roll material contains 80 or more percent by weight of anthophyllite asbestos fiber or other asbestos fiber stated above based upon the total weight of asbestos fiber therein. Other fibers may also be present. Thus, crocidolite asbestos having a composition of $NaFe(SiO_3)_2FeSiO_3.H_2O$, and known as blue fiber, may be incorporated in a mixture of the specific asbestos fibers enumerated above.

For example, a suitable mixture may include 50 percent by weight of anthophyllite asbestos fiber and 50 percent by weight of crocidolite asbestos fiber plus a suitable binder, as for example, 5 percent by weight of calcium silicate. Moreover, the conventionally used chrysotile may be present.

Among other advantageous properties, a roll having a major percentage of anthophyllite asbestos fiber has less shrinkage as compared to a product having a major percentage of chrysotile asbestos fiber. Moreover, no serious transformation of the roll material to a glassy refractory occurs. When pressure on the discs is released, due to mandrel expansion, less roll disc separation occurs. Even SO₂ gas does not react adversely with the anthophyllite asbestos.

In the practice of the float process, portions of the glass frequently are marked with an unsightly visible defect usually in the underside thereof. The location of the defect on the ribbon may vary, but often the pattern of the objects is repetitive. These defects cannot be permitted to appear in glass supplied to the customer and consequently the resulting glass must be cut in a manner such as to exclude the defect. When the defects are in a central area of the glass, as frequently occurs, the size of glass which may be cut from the ribbon may be seriously limited. Thus, the yield of saleable glass is reduced.

As the ribbon is formed in the float process, it moves while floating on the molten tin or other metal toward the exit end of the metal pool. At the end of the pool it is lifted and conveyed on rolls through the annealing lehr to the location where glass sheets are cut from the ribbon. The first series of rolls thus engaging the glass, which may amount to 10, 15 or more rolls, carry the glass through an area where it is inevitably exposed to the same atmosphere as a portion thereof which is disposed over the molten metal bath. Using metal rolls, the above defects occur regularly.

In the drawing, which is a part of this application, FIG. 1 is a schematic view of a typical Pittsburgh or Pennvernon sheet glass drawing arrangement.

Figure 2:
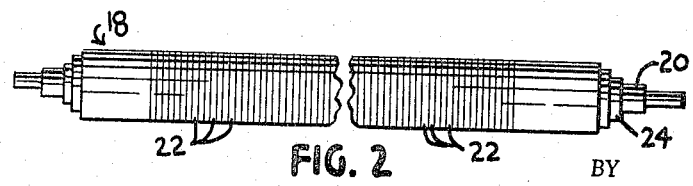
Figure 3:
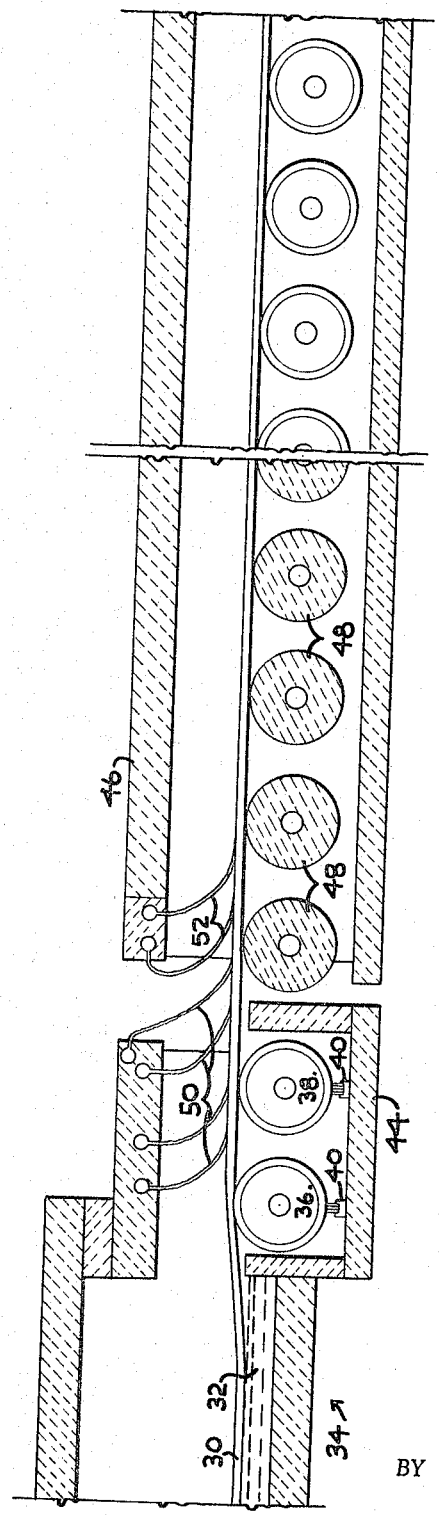

FIG. 2 illustrates a typical traction roll usable in the FIG. 1 arrangement; and FIG. 3 is a longitudinal section through a typical float glass apparatus showing the take-off rolls and the entry portion of the annealing lehr.

In FIG. 1, a ribbon of glass 10 is drawn upwardly from a molten bath 12 through a cooled drawing chamber 14 by means of a drawing machine 16 having pairs of traction rolls 18 which engage the surfaces of the cooled ribbon and pairs of swing rolls 19 which can engage the sheet as it is initially formed but which swing out of engagement after the sheet is satisfactorily being drawn through the machine. The rolls 18 and 19 are identical in construction.

FIG. 2 shows a typical traction roll 18 usable in the drawing machine 16. The roll 18 includes a mandrel 20 (see also FIG. 1) onto which are assembled in side-by-side contacting arrangement a plurality of discs 22 of asbestos-binder composition. The discs generally compose a plurality of layers of asbestos paper containing a small amount (2 to 10%) by weight of a convenient binder such as Portland cement, sodium silicate or the like. End clamps and collars 24 hold the discs under pressure after their assembly.

The following are typical examples of the application of this invention to sheet glass production.

*Example I*

A plurality of discs having an outside diameter of 9 inches and an inside diameter of 6.25 inches were cut from an asbestos board of nominal ¼ inch thickness.

The board was made by the wet mix process in which individual layers were laid down one upon the other by successively depositing an asbestos slurry containing a binder upon a screen and then upon the topmost deposited layer until the desired thickness has been built up. The board is then dried, usually under moderate pressure. A Fourdrinier machine may be used for this purpose. The board contained 80 parts by weight of anthophyllite asbestos fiber, 20 parts by weight of chrysotile asbestos, and 5 parts by weight of calcium silicate as a binder. Groups of 5 discs were nailed together using 4d headed nails, so that the nail points protruded approximately ¼ inch from one side of the assembly.

The groups of discs were then assembled onto a carbon steel mandrel 147 inches in length and 6.25 inches in outside diameter. A sufficient number of groups of discs were assembled thereon and placed under a pressure of 1200 pounds per square inch to produce a roll having a length of 141 inches confined between 3-inch collars at the opposite ends thereof. The roll was then lathe turned to an outside diameter of 8½ inches. The surface of the roll appeared to be continuous and without indication of its construction of a plurality of discs. The roll surface was dull in appearance after surfacing. There were approximately 700 discs in the finished roll.

The turned roll was placed in a drawing machine and subjected to temperatures of 1200° F. and above. It was inspected periodically and after six weeks of operation showed no change in its surface characteristics.

*Example II*

The same procedure is followed as in Example I with the boards from which the discs are cut containing 80 parts by weight of actinolite asbestos fibers and 20 parts by weight of chrysotile asbestos fiber plus 5 parts by weight of calcium silicate as a binder.

The results are the same as indicated in Example I.

*Example III*

The same procedure is followed as in Example I with the boards from which the discs are cut containing 50 parts by weight of crocidolite asbestos fiber and 50 parts by weight of anthophyllite asbestos fiber plus 5 parts by weight of calcium silicate as a binder.

The results are the same as indicated in Example I.

The rolls herein contemplated have been found to have excellent life in areas where conventional chrysotile asbestos rolls have poor life. In certain cases it is desirable to carefully anneal the glass ribbon as it moves upward and before it is cut. In such a case, a substantial portion of the area or zone where rolls regularly engage the glass is held at a high temperature, for example, 1000 to 1300° F. or above. At these high temperatures chrysotile asbestos rolls become defective within only one or two weeks, whereas the rolls herein contemplated last many (often 6 to 9 months or more) months.

As shown by the examples, the herein contemplated rolls need not be composed entirely of anthophyllite fiber or its equivalent but may also contain a substantial amount of the more common chrysotile asbestos. As a general rule, the amount of anthophyllite and/or equivalent fiber (amosite, tremolite, or actinolite) should not be less than 30% by weight of the entire asbestos fiber therein and where the roll is to be exposed to temperatures of 1100° to 1600° F., this content should be at least 50% by weight of the asbestos fiber in the roll.

FIG. 3 shows a longitudinal section through a portion of a typical float glass producing apparatus. Here, a ribbon of glass 30 has been treated on a bath 32 of molten liquid, such as molten tin or tin alloy or other metal, contained within a tank 34, and is lifted from the bath at the exit end of the tank by rolls 36 and 38 suitably journeled and driven by means, not shown. Carbon blocks 40 and 42 are spring pressed against the rolls 36 and 38, respectively, so as to remove any materials which become deposited thereon. The blocks 40 and 42 are supported by a tank extension 44 into which removed deposited material will fall for removal.

The glass is conveyed into an annealing lehr 46 having a plurality of lehr rolls 48 therein. Means, not shown, such as a chain drive, are provided for driving the rolls. Each roll exerts a tractive force on the glass of sufficient magnitude to convey the glass through the lehr where its temperature is controlled to release permanent stress and strain in the glass.

A protective reducing atmosphere, such as nitrogen with perhaps a small percentage of hydrogen, is maintained over the bath 32 within the tank 34 in order to protect the bath from oxidization. Generally, the atmosphere contains 90 to 99.9 percent nitrogen and the remainder hydrogen. The atmosphere is maintained at a slight pressure above ambient pressure, as for example, 0.1 to 0.5 inch water, to substantially prevent the ingress of the ambient atmosphere within the tank 34. To retain the atmosphere and to permit the passage of the glass ribbon from the tank 34, the exit end of the tank is provided with a series of curtains or drapes 50 which trail on the glass ribbon. These drapes or curtains are usually made of an asbestos material which will not mar the glass and will withstand the temperature involved, which is approximately 1000° F. to 1200° F. at or adjacent the exit end of the tank 34.

Additional drapes or curtains 52 of similar material are provided at the entrance end of the lehr 46. In spite of the precautions taken, i.e., the use of multiple curtains and drapes, gases flow from the tank into the lehr, this condition being called "sting-out" or "carry-over." Previously these rolls have been constructed of stainless steel, so as to withstand the temperatures involved. However, the glass has the defects mentioned above.

When rolls constructed of material according to this invention are used, the amount of these defects is substantially reduced and often eliminated. The reason for this improvement is not understood. It may be due to a variety of reasons. For example, there appears to be less tendency for the components of the atmosphere (tin or tin oxide vapor or like low volatile component) to condense on the rolls. The roll surface may be better able to accommodate itself to the glass and/or to the contaminants in the roll, for example, it may be less easy to wet with tin or the vapors produced by a tin metal bath, or it may present a surface of low heat conductivity which tends to minimize condensation thereon. Whatever the reason, the glass has less defects when a portion or all of the rolls immediately adjacent the metal bath are composed as herein contemplated.

A typical lehr of the type described is approximately 360 feet in length and the rolls are 12 inches in diameter and are journeled on 12 to 18 inch centers, being more closely spaced at and adjacent the entrance end of the lehr where the glass is at an elevated temperature and deformable than at the exit end of the lehr where the glass is relatively cold. For example, glass enters the lehr at 1000° F. to 1200° F. or above and exits at 150° F. to 250° F.

In the practice of the float process, conditions of operation are, of course, different from that of sheet glass production and it is found that crocidolite asbestos may be used in lieu of anthophyllite or like fiber to form the rolls for such process, provided that the crocidolite concentration is preferably above 30 percent, i.e., 50 percent or more by weight of the asbestos fiber content thereof.

The first 10 or 15 rolls 48 may be comprised of anthophyllite (or equivalent) as described above. The latter rolls may be of ordinary asbestos or of metal. Rolls 36 and 38 also may advantageously comprise anthophyllite or the like, although satisfactory glass may be obtained even when these are of metal.

The exact number of rolls which should have the composition herein contemplated depends upon the conditions of operation. Ideally, all rolls which support and engage the glass ribbon in an area where there is potential exposure to an atmosphere created over the metal pool should be constructed according to this invention. However, even a single roll of this invention when substituted for a conventional roll in an area shortly after removal of the ribbon from the metal pool will normally improve the resulting quality of the glass obtained.

Although the present invention has been described with reference to the specific details of certain embodiments, it is not intended that such embodiments shall impose a limitation upon the scope of the invention except insofar as included in the accompanying claims.

What is claimed is:

1. A roll especially adapted for use at elevated temperatures having a material engaging surface containing at least 30 percent by weight of an asbestos fiber selected from the group consisting of anthophyllite asbestos, amosite asbestos, tremolite asbestos, actinolite asbestos and mixtures thereof.

2. A roll especially adapted for use at elevated temperatures having a material engaging surface containing not less than 50 percent by weight of an asbestos fiber selected from the group consisting of anthophyllite asbestos, amosite asbestos, tremolite asbestos, actionlite asbestos and mixtures thereof.

3. A traction roll for engaging glass having a glass engaging surface containing at least 30 percent by weight anthophyllite asbestos.

4. A traction roll for engaging glass which includes a support adapted to be mounted for rotation about its major axis and a covering on said support for engaging glass containing at least 50 percent by weight of an asbestos fiber selected from the group consisting of anthophyllite asbestos, amosite asbestos, tremolite asbestos, actinolite asbestos and mixtures thereof.

5. A traction roll as recited in claim 4 wherein said covering contains at least 80 percent by weight of said asbestos.

6. A traction roll for use in a sheet glass drawing apparatus and which contacts the surface of a ribbon of glass being drawn from a bath of molten glass which comprises a rotatable support, means to rotate said support, a plurality of discs receivable in side-by-side relation on said support and being held thereon to provide a glass engaging covering for said support, each of said discs containing at least 50 percent by weight of an asbestos fiber selected from the group consisting of anthophyllite asbestos, amosite asbestos, tremolite asbestos, actinolite asbestos and mixtures thereof.

7. In an apparatus for forming flat glass, means for forming a ribbon of flat glass by withdrawing glass from a molten bath thereof, and means for conveying said glass while in a deformable state from said first-named means, said conveying means including at least one glass-supporting roll having a glass-engaging surface containing at least thirty percent by weight of a material selected from the group consisting of an anthophyllite asbestos, amosite asbestos, tremolite asbestos, actinolite asbestos and mixtures thereof.

8. A roll as recited in claim 1 wherein said asbestos fiber is anthophyllite asbestos.

References Cited by the Examiner

UNITED STATES PATENTS 1,909,948   5/1933   Halbach ———————— 65—374 X

FOREIGN PATENTS 616,798   8/1935   Germany.

OTHER REFERENCES

U.S. Bureau of Mines Bulletin No. 403.
The Paper Industry and Paper World, October 1945, pp. 1091–1092.

DONALL H. SYLVESTER, Primary Examiner.

A. D. KELLOGG, Assistant Examiner.